US012709016B2

(12) United States Patent
Horgan et al.

(10) Patent No.: US 12,709,016 B2
(45) Date of Patent: Aug. 18, 2026

(54) PROCESS TOOL TENDING ROBOTS

(71) Applicant: Analog Devices International Unlimited Company, Co. Limerick (IE)

(72) Inventors: Kieran Horgan, Brosna (IE); Willie Ashe, Portland, OR (US); Connor Baele, Beaverton, OR (US); Jose Jesus Garcia, North Plains, OR (US); Jacob Hankland, Beaverton, OR (US); Ian Ashe, Portland, OR (US); Sushen Bhagavat Thumpudi, Beaverton, OR (US)

(73) Assignee: Analog Devices International Unlimited Company, Co. Limerick (IE)

( * ) Notice: Subject to any disclaimer, the term of this patent is extended or adjusted under 35 U.S.C. 154(b) by 0 days.

(21) Appl. No.: 18/947,477

(22) Filed: Nov. 14, 2024

(65) Prior Publication Data

US 2025/0375896 A1 Dec. 11, 2025

Related U.S. Application Data

(60) Provisional application No. 63/658,573, filed on Jun. 11, 2024.

(51) Int. Cl.
*B25J 11/00* (2006.01)
*B25J 9/04* (2006.01)
*B25J 15/06* (2006.01)

(52) U.S. Cl.
CPC ........... *B25J 11/0095* (2013.01); *B25J 9/046* (2013.01); *B25J 15/0616* (2013.01)

(58) Field of Classification Search
CPC ..... B25J 11/0095; B25J 9/046; B25J 15/0616
See application file for complete search history.

(56) References Cited

U.S. PATENT DOCUMENTS 5,229,615 A * 7/1993 Brune ................. H01J 37/3171 250/442.11
5,709,519 A * 1/1998 Uehara ............. H01J 37/32743 414/940

(Continued)

FOREIGN PATENT DOCUMENTS

CN 210339565 U 4/2020
CN 116062455 A 5/2023

(Continued)

OTHER PUBLICATIONS

Enabled Robotics, Semiconductor & Electronics, retrieved and printed on Apr. 28, 2025 in 3 pages.

(Continued)

*Primary Examiner* — Victor L Macarthur
(74) *Attorney, Agent, or Firm* — Knobbe, Martens, Olson & Bear, LLP

(57) ABSTRACT

Apparatus and methods for process tool tending in a semiconductor fab are disclosed. In certain embodiments, a robot includes a robotic arm and a turntable that rotates relative to the robotic arm. The turntable holds at least one lot box storing a wafer cassette of semiconductor wafers, and the robotic arm includes an end-effector operable to manipulate the lot box. Accordingly, the robot handles wafer lot boxes to improve semiconductor fab throughput by automating unloading and loading processes that are conventionally performed manually. For example, the robot can transport a wafer lot box to a point of use, remove the wafer cassette from the lot box, load the wafer cassette into a tool at the point of use, remove the wafer cassette from the tool after processing, reload the wafer cassette into the lot box, and transport the lot box to the next point of use.

18 Claims, 14 Drawing Sheets

(56) References Cited

U.S. PATENT DOCUMENTS

| | | | | |
|---|---|---|---|---|
| 6,142,722 | A * | 11/2000 | Genov | H01L 21/67766 414/217 |
| 10,040,194 | B1 * | 8/2018 | Theobald | B65G 1/1375 |
| 2001/0011000 | A1 | 8/2001 | Okumura et al. | |
| 2005/0102064 | A1 * | 5/2005 | Donoso | H01L 21/67259 700/254 |
| 2007/0264106 | A1 * | 11/2007 | van der Meulen | B25J 9/0084 414/217 |

FOREIGN PATENT DOCUMENTS

| | | | |
|---|---|---|---|
| CN | 220882340 | U | 5/2024 |
| JP | H06-218678 | A | 8/1994 |
| JP | 2002283270 | A * | 10/2002 |
| JP | 2002286091 | A * | 10/2002 |
| JP | 2021064689 | A * | 4/2021 |
| JP | 2023132761 | A * | 9/2023 |

OTHER PUBLICATIONS

GYROBOT, Product: Semiconductor Smart Factory and Unmanned Factory Efficiency Solution Leader, Leading Provider of Automation Solutions, retrieved and printed on Apr. 28, 2025 in 2 pages.

"HERO® FAB 300, Mobile robot for 300mm FOUP, transportation and handling tasks", FABMATICS, retrieved and printed on Apr. 28, 2025 in 2 pages.

"HERO FAB 200, Mobile robot for 200mm wafer, transportation and handling tasks", FABMATICS, retrieved and printed on Apr. 28, 2025 in 2 pages.

KUKA, "Electronics KUKA Wafer Handling Solution", retrieved and printed on Apr. 28, 2025 in 2 pages.

MERIDIONALE IMPIANTI, "Intro Robotic", retrieved and printed on Apr. 28, 2025 in 6 pages.

Extended European Search Report issued in European Patent Application No. 25176092.2, dated Nov. 7, 2025, in 8 pages.

Office Action issued in Taiwanese Patent Application No. 202411355018.3 dated Jan. 28, 2026, in 17 pages.

* cited by examiner

PROCESS TOOL TENDING ROBOTS

INCORPORATION BY REFERENCE TO ANY PRIORITY APPLICATIONS

The present application claims priority to U.S. Provisional Patent Application No. 63/658,573, filed Jun. 11, 2024, and titled "PROCESS TOOL TENDING ROBOTS," the entirety of which is hereby incorporated herein by reference.

FIELD OF THE DISCLOSURE

The disclosed technology relates generally to semiconductor processing, and more particularly to robots for tending process tools used for semiconductor wafer fabrication.

BACKGROUND

A robot is generally a reprogrammable and multifunctional manipulator, often designed to move through programmed motions for performance of a variety of tasks or functions. Robots may be manipulators that are physically anchored (for instance, industrial robotic arms) or mobile robots that autonomously or semi-autonomously navigate environments (e.g., using legs, wheels, or traction-based mechanisms). Robots can utilize sensors to aid in accomplishing tasks without colliding with obstacles and/or becoming stuck or trapped.

Some robots have articulated arms that may perform a variety of tasks by operating motorized joints of the arm. Such arms may have a device at the end of the arm, referred to as an end-effector, that can be moved around in the environment by operating the arm. Examples of end-effectors include grippers such as jaws, claws, or mechanical fingers.

Robots are utilized in a variety of industries including, for example, manufacturing, warehouse logistics, transportation, hazardous environments, exploration, and healthcare.

SUMMARY OF THE DISCLOSURE

Apparatus and methods for process tool tending in a semiconductor fab are disclosed. In certain embodiments, a robot includes a robotic arm and a turntable that rotates relative to the robotic arm. The turntable holds at least one lot box storing a wafer cassette of semiconductor wafers, and the robotic arm includes an end-effector operable to manipulate the lot box. Accordingly, the robot handles wafer lot boxes to improve semiconductor fab throughput by automating unloading and loading processes that are conventionally performed manually. For example, the robot can transport a wafer lot box to a point of use, remove the wafer cassette from the lot box, load the wafer cassette into a tool at the point of use, remove the wafer cassette from the tool after processing, reload the wafer cassette into the lot box, and transport the lot box to the next point of use. Thus, the robot enables full removal of one or more humans from process tool tending in semiconductor fabs, such as legacy semiconductor fabs for 6-inch/8-inch wafers.

In one aspect, a robot for process tool tending in a semiconductor fab is disclosed. The robot includes a robotic arm and a turntable configured to rotate relative to the robotic arm. The turntable is configured to hold at least one lot box storing a wafer cassette of semiconductor wafers, and the robotic arm includes an end-effector configured to manipulate the at least one lot box.

In another aspect, a method of robotic process tool tending in a semiconductor fab is disclosed. The method includes controlling a rotation of a turntable of a robot relative to a robotic arm of the robot, the turntable holding at least one lot box storing a wafer cassette of semiconductor wafers. The method further includes controlling a position of the robotic arm relative to the at least one lot box, and manipulating the at least one lot box using an end-effector of the robot.

DETAILED DESCRIPTION

Figure 1A:
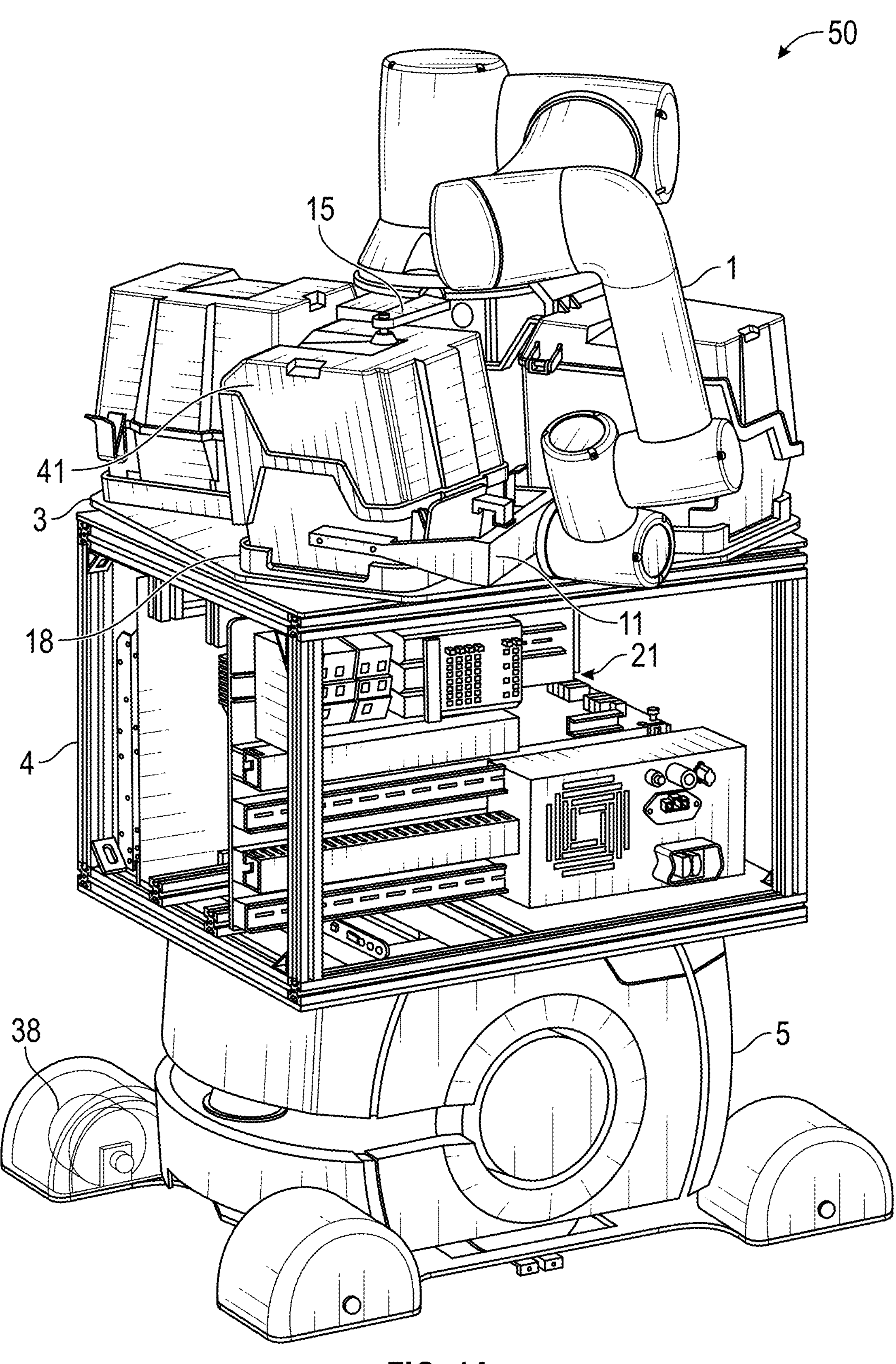
FIG. 1A is a perspective view of a robot according to one embodiment.
Figure 1B:
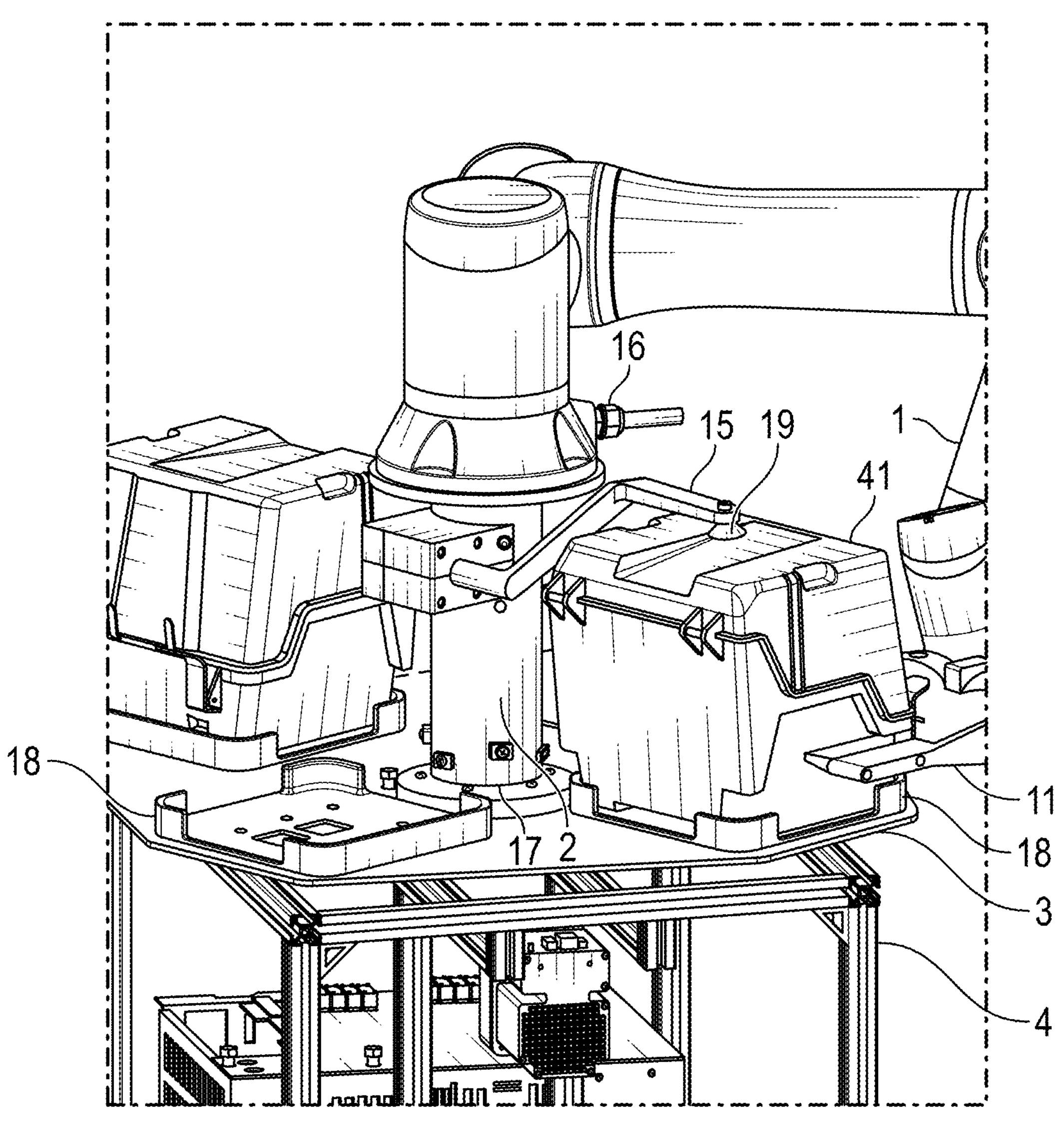
FIG. 1B is a perspective view of a portion of the robot of FIG. 1A including a turntable and a robotic arm on a pedestal.
Figure 1C:
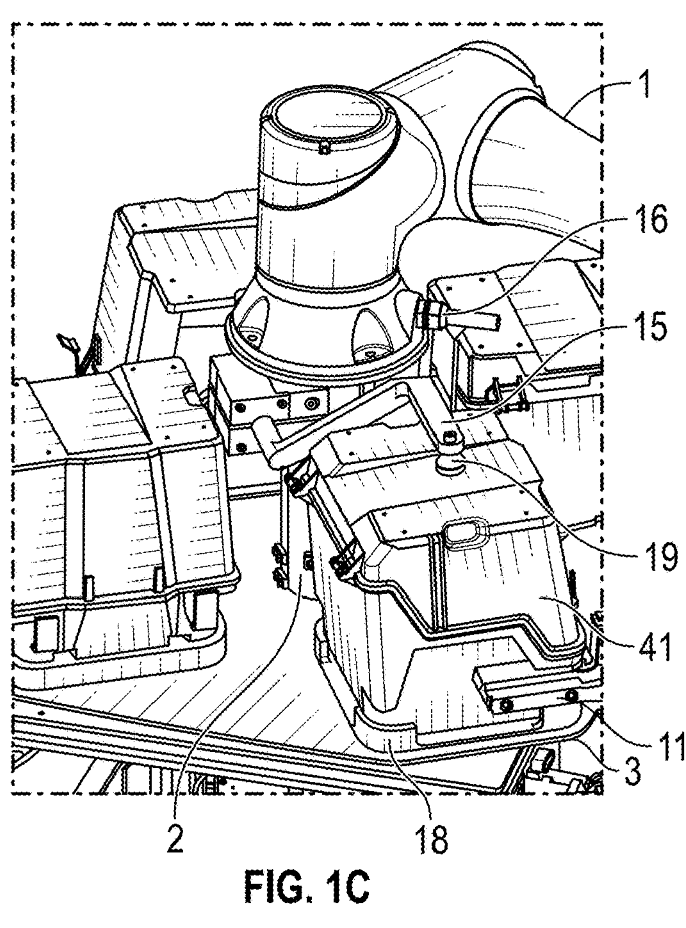
FIG. 1C is a perspective view of the robot of FIG. 1A focused on a box opener of the robot.

The following detailed description of embodiments presents various descriptions of specific embodiments of the invention. However, the invention can be embodied in a multitude of different ways. In this description, reference is made to drawings. It will be understood that elements illustrated in the figures are not necessarily drawn to scale. Moreover, it will be understood that certain embodiments can include more elements than illustrated in a drawing and/or a subset of the elements illustrated in a drawing.

Further, some embodiments can incorporate any suitable combination of features from two or more drawings.

Certain legacy process tools for semiconductor wafer fabrication are not compatible with modern automated material handling systems (AMHS) for semiconductor processing. For example, certain process tools for handling 6-inch (150 mm) and/or 8-inch (200 mm) silicon wafers are incompatible with AMHS.

It is desirable to fully automate the tending of legacy process tools and manual handling of wafers. For example, automating tending in this manner allows removal of a person from the process tool tending flow thus eliminating human variability and/or high labor costs.

Apparatus and methods for process tool tending in a semiconductor fab are disclosed. In certain embodiments, a robot, such as an automated mobile robot (AMR), includes a robotic arm and a turntable that rotates relative to the robotic arm. The turntable holds at least one lot box storing a wafer cassette of semiconductor wafers, and the robotic arm includes an end-effector operable to manipulate the lot box.

Accordingly, the robot handles wafer lot boxes to improve semiconductor fab throughput by automating unloading and loading processes that are conventionally performed manually. For example, the robot can transport a wafer lot box to a point of use, remove the wafer cassette from the lot box, load the wafer cassette into a tool at the point of use, remove the wafer cassette from the tool after processing, reload the wafer cassette into the lot box, and transport the lot box to the next point of use.

Thus, the robot enables full removal of one or more humans from process tool tending in semiconductor fabs, such as legacy semiconductor fabs for 6-inch/8-inch wafers.

In certain implementations, the robotic arm operates with an end-effector that operates without a need for actuation. For instance, the end-effector can be fully passive or static. This in turn decreases cost, particle generation, failure points, and/or programming complexity. Such an end-effector can be implemented to manipulate both lot boxes as well as wafer cassettes stored within the lot boxes.

For example, a passive end-effector can be used for moving lot boxes, unlocking/locking lot boxes, removing wafer cassettes from lot boxes, loading wafer cassettes into process tools, removed wafer cassettes from process tools, inserting wafer cassettes into lot boxes, and/or otherwise interacting with the lot boxes and wafer cassettes.

In some implementations, the robotic arm is a 6-axis articulated robotic arm operating with 6 axes of freedom while the turntable provides a 7th axis of freedom. Although a 6-axis articulated robotic arm by itself has highly controllable movement, the turntable can eliminate multiple additional movements of the robotic arm without increasing the robot's overall footprint. In contrast, conventional robots require additional movement steps that impact throughput, cost, and/or case of integration into a semiconductor fab.

Accordingly, the turntable provides an additional axis of motion to reduce the robotic arm's total amount of movement. Furthermore, the turntable can aid the robotic arm in interacting with multiple lot boxes, thereby allowing the same robot to simultaneously transport and tend to multiple wafer lots. For example, two or more lot boxes can be stored on the turntable, and the turntable can rotate a particular lot box to a desired position for interaction with the robotic arm.

In certain implementations, a pedestal for the robotic arm passes through a center of the turntable, thereby positioning the robotic arm above and centered about the turntable in an excavator-like configuration. Thus, the turntable can rotate relative to the robotic arm and pedestal to place the lot boxes in a desired position.

The robot can further include a box opener, such as box opening suction arm, for opening lot boxes. For example, the box opener can be secured to the pedestal or other desired location on the robot, and the turntable can rotate a particular lot box to be aligned with the box opener. Once the lot box is unlocked by the robotic arm and opened by the box opener, the robotic arm can interact with the wafer cassette stored therein.

In certain implementations, the robotic arm and turntable are part of an application layer of the robot that is fully customizable. For example, the application layer can add additional axis of motion, a robotic arm, sensors, and/or other automated or semi-automated functionality. Furthermore, the application layer can be compatible with a wide variety of implementations of robotic arms, sensors, or other components, thereby providing modularity and flexibility.

Such as application layer can rest on a housing of the robot, which in turn can be attached to any desired base. To facilitate a broad range of deployments, the application layer can be implemented to be entirely agnostic towards the housing and/or base. In one example, the robot includes a mobile base, such as a modular omni-wheeled base providing both stability and mobility. In another example, the robot is mounted on a benchtop for static tool tending. Thus, the robot can be highly modular.

FIGS. 1A to 1I depict various views of a robot 50 according to one embodiment. The robot 50 includes a robotic arm 1, a robotic arm pedestal 2, a turntable 3, a housing 4, and a mobile base 5. An end-effector 11 is attached an end of the robotic arm 1. Additionally, a box opener (corresponding to a box opening suction arm 15, in this example) is attached to the robotic arm pedestal 2.

In the illustrated embodiment, the housing 4 is positioned over the mobile base 5, and an application layer of components is positioned over the housing 4. Thus, the robot 50 generally includes three layers of components: (i) the mobile base 5 for navigating the robot 50 about a surrounding environment, (ii) the housing 4 for housing various electrical and mechanical components for controlling the operating of the robot 50; and (iii) the application layer for interacting with lot boxes 41, wafer cassettes stored in the lot boxes 41, process tools, and/or other objects in the surrounding environment.

In this embodiment, the application layer includes the robotic arm 1, the robotic arm pedestal 2, the turntable 3, and the box opening suction arm 15. However, the application layer of the robot 50 can be adapted according to a particular function or set of functions the robot 50 is implemented to perform. For example, the application layer is fully customizable to add additional axis of motion, sensors, and/or other desired functionality.

The mobile base 5 of FIGS. 1A-1I includes wheels 38 for moving the robot 50 about the environment. However, the robot 50 can be implemented with other locomotion-based structures, such as treads, legs, and/or other structures. Furthermore, the teachings herein are applicable to robots that are physically constrained in one or more dimensions, for instance, mounted in place or configured to operate along rails or tracks. Thus, a robot can be implemented as needed for a particular application.

With continuing reference to FIGS. 1A-1I, the robot 50 is mobile in this example, and thus serves as an automated mobile robot (AMR). Thus, the robot 50 is capable of navigating around a semiconductor fab to tend to process tools used for processing semiconductor wafers stored in wafer cassettes in the lot boxes 41.

For example, the robot can transport the lot boxes 41 to a point of use, and thereafter remove the wafer cassettes from the lot boxes 41 and load the wafer cassettes into a tool at the point of use. For instance, the tool can correspond to any semiconductor processing equipment for processing one or more of the wafer cassettes serially or in parallel. Examples of tools include, but are not limited to, lithography machines, wafer thinning equipment, deposition chambers, diffusion furnaces, etchers, and/or testing equipment. After processing by the tool, the robot 50 can remove the wafer cassettes from the tool and reload the wafer cassettes into the lot boxes 41 for transport to the next point of use.

In the illustrated embodiment, the robot 50 includes the robotic arm 1, which functions as a robotic manipulator. The end-effector 11 is attached an end of the robotic arm 1 (for instance, to a tool flange), and the robotic arm 1 is configured to move with multiple degrees of freedom to allow the end-effector 11 to interact with objects in the environment. The robotic arm 1 can be implemented with various members that are coupled by joints to allow the robotic arm 1 to pivot about the joints. In the illustrated example, the robotic arm 1 is a 6-axis articulated robotic arm.

The end-effector 11 is fully passive, in this embodiment. Thus, rather than including an actuated gripper or suction mechanism, the end-effector 11 is fully passive or static. By implementing the end-effector 11 to be fully passive, particle generation is decreased to reduce contamination of semiconductor wafers and improve foundry yield. Furthermore, including a passive end-effector can decrease cost, lower the number of failure points, and/or reduce programming complexity.

With continuing reference to FIGS. 1A-1I, the robotic arm 1 is attached to the robotic arm pedestal 2. In certain implementations, the robotic arm 1 fits into a socket of the robotic arm pedestal 2 and is secured in any suitable way, such as using a locking pin or bolt 16. However, other implementations are possible.

In the illustrated embodiment, the robotic arm pedestal 2 passes through an opening 17 at a center of the turntable 3. The robotic arm pedestal 2 is secured to the housing 4, in this example. In addition to structurally supporting the robotic arm 1, the robotic arm pedestal 2 can also be used for other functions, such as carrying wires (for instance, for power and/or data) between the housing 4 and the robotic arm 1.

The turntable 3 turns relative to other fixed components, such as the robotic arm pedestal 2 and the housing 4. Accordingly, the turntable 3 provides an additional axis of freedom to aid the robotic arm 1 in interacting with objects in a fewer number of moves or maneuvers. Furthermore, the turntable 3 adds an axis for movement without increasing the robot's overall footprint. For example, when used in conjunction with the 6-axis articulated robotic arm 1, the turntable 3 provides a 7th axis of freedom. A turntable is also referred to herein as a carousel or lot carousel.

With continuing reference to FIGS. 1A-1I, the turntable 3 is implemented with various lot box holders 18 for securing lot boxes 41. In this example, the turntable 3 includes four lot box holders 18 that have radial symmetry with respect to a center of the turntable 3. The robotic arm 1 uses the end-effector 11 to insert or remove each lot box 41 into or out of a corresponding lot box holder 18. The lot box holders 18 aid in keeping lot boxes 41 secured as the robot 50 navigates about the environment and/or as the turntable 3 rotates. In this example, each of the lot box holders 18 includes four corner sections for securing the bottom of each lot box 41 at each of four corners. However, other implementations are possible.

Each of the lot boxes 41 can hold a wafer cassette for transporting wafers. The lot boxes 41 can be locked or unlocked by the robotic arm 1 manipulating the lot boxes 41 with the end-effector 11. Locking the lot boxes 41 can help secure the wafer cassettes when undergoing transport, while the lot boxes 41 can be unlocked to allow a particular lot box to be opened such that a wafer cassette can be inserted, removed, or otherwise interacted with.

In the illustrated embodiment, the box opening suction arm 15 is attached to the robotic arm pedestal 2. The box opening suction arm 15 includes a suction mechanism 19 for applying a suction force to the lot box's lid. The suction force allows the lot box 41 to be opened by actuation of the suction arm 15. Thus, the turntable 3 can be used to rotate a particular one of the lot boxes 41 to align with the suction mechanism 19, which can apply a suction force to the lot box's lid. Thereafter, the suction arm 15 is actuated and the box is opened.

Figure 1D:
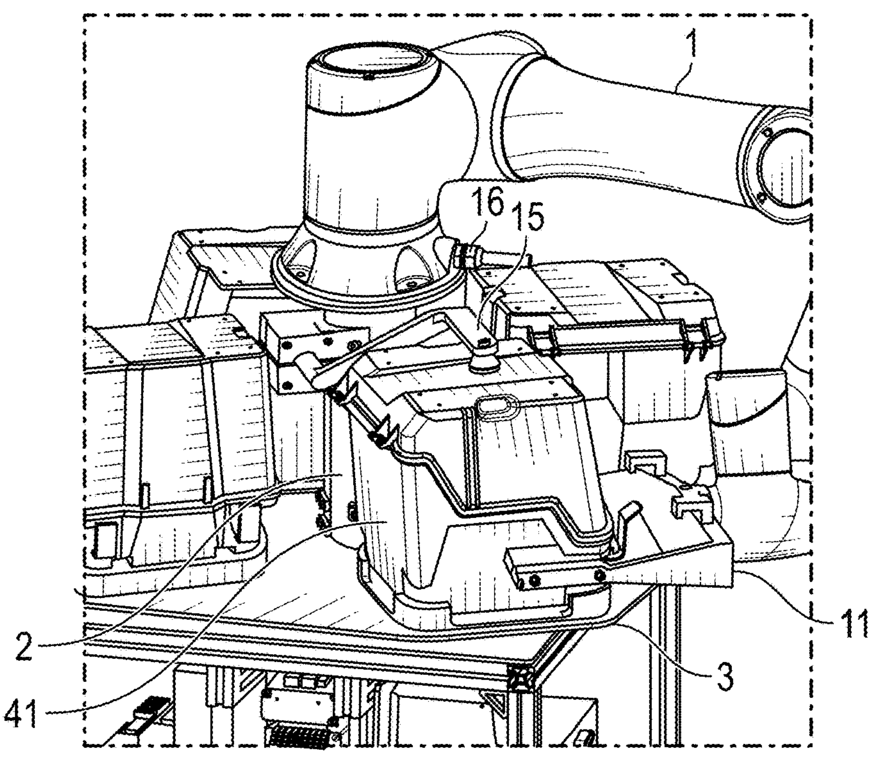
FIG. 1D is a perspective view of the robot of FIG. 1A focused on a closed lot box on the turntable.
Figure 1E:
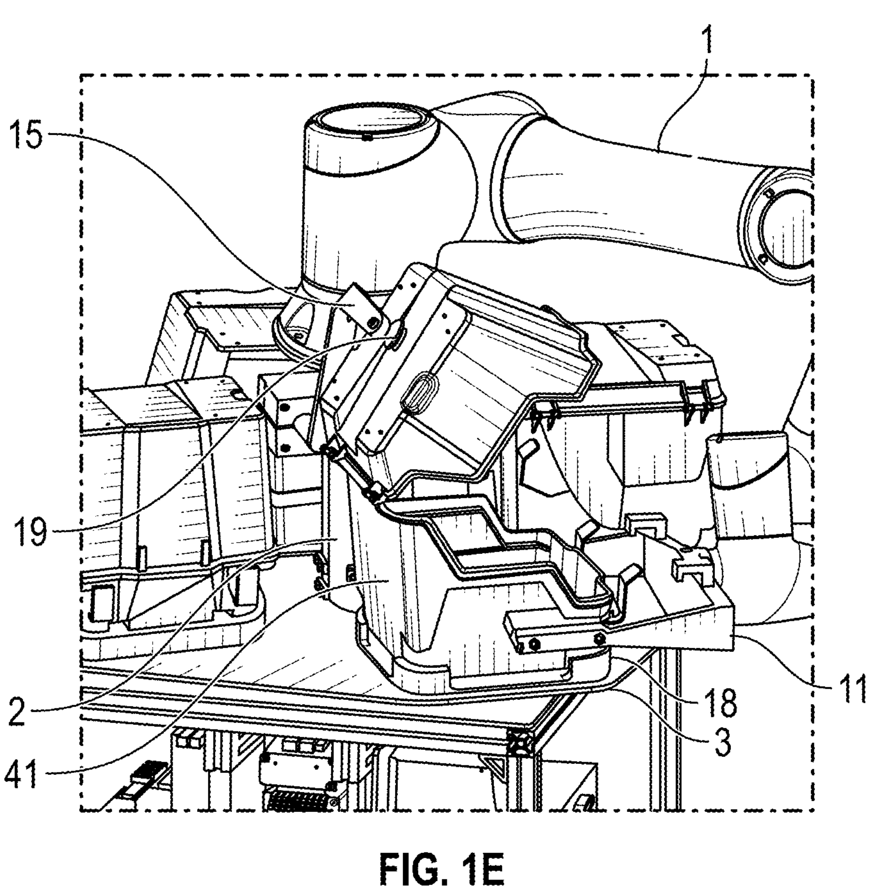
FIG. 1E is a perspective view of the robot of FIG. 1A focused on an opened lot box on the turntable.
Figure 1F:
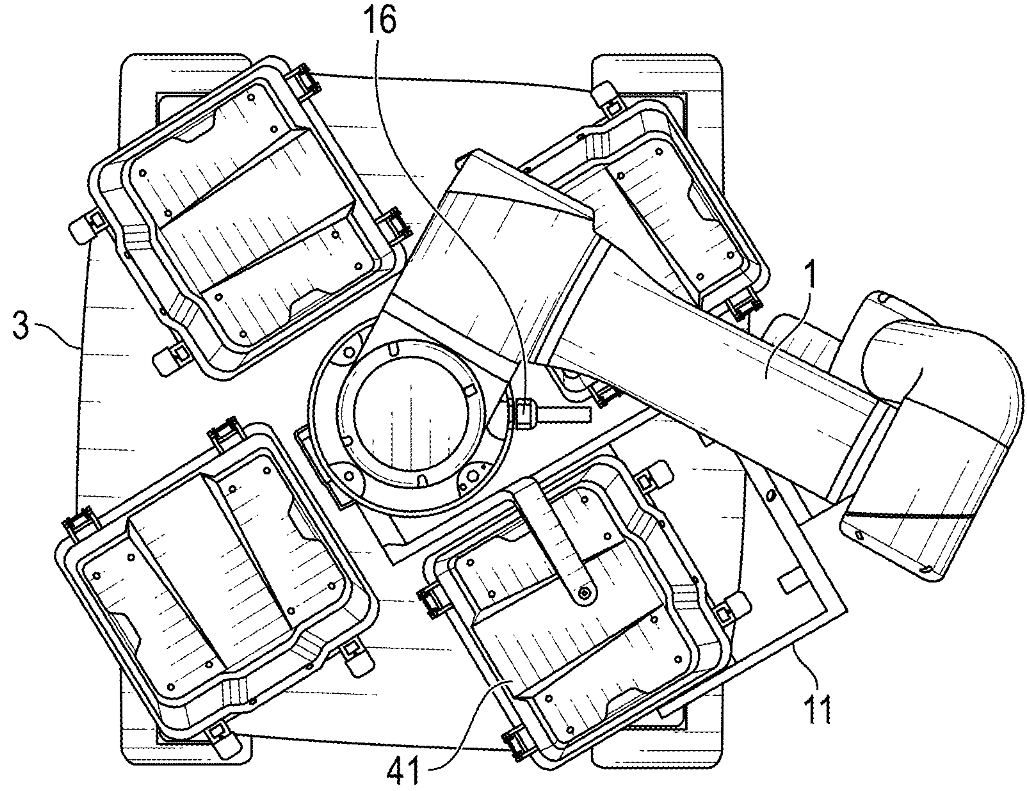
FIG. 1F is an overhead view of the robot of FIG. 1A.
Figure 1G:
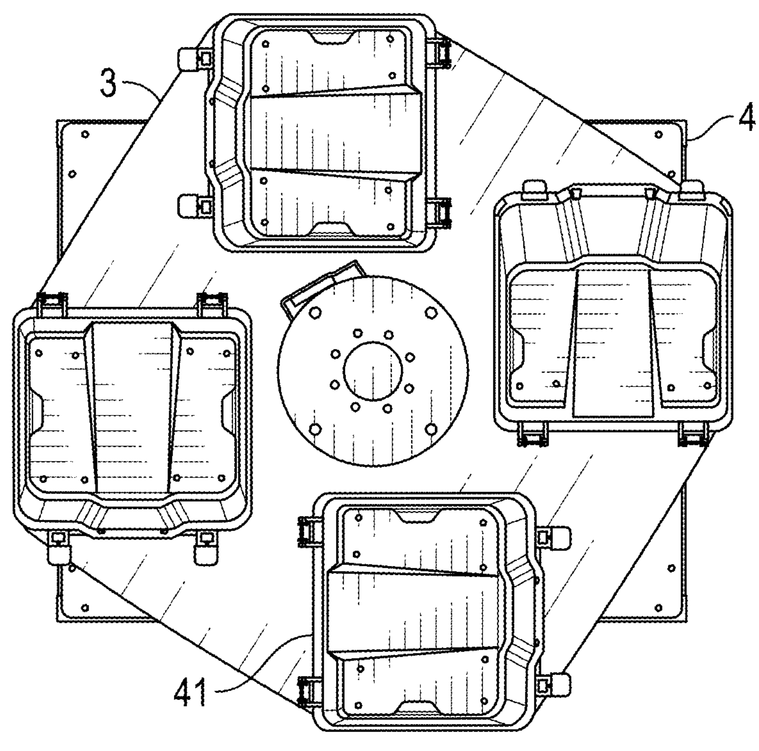
FIG. 1G is an overhead view of the robot of FIG. 1A with the robotic arm omitted and with the turntable rotated to a first position.
Figure 1H:
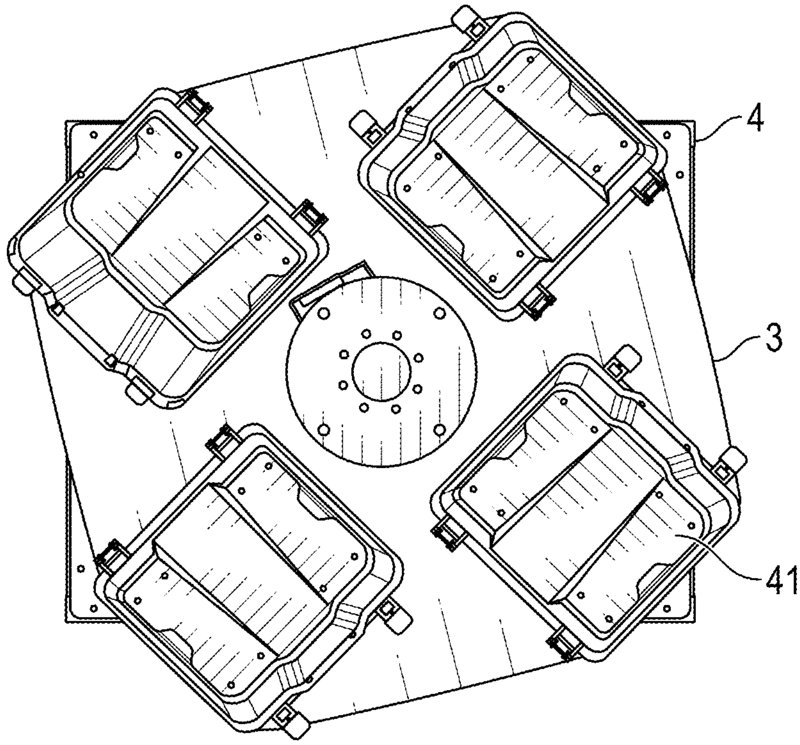
FIG. 1H is an overhead view of the robot of FIG. 1A with the robotic arm omitted and with the turntable rotated to a second position.
Figure 1I:
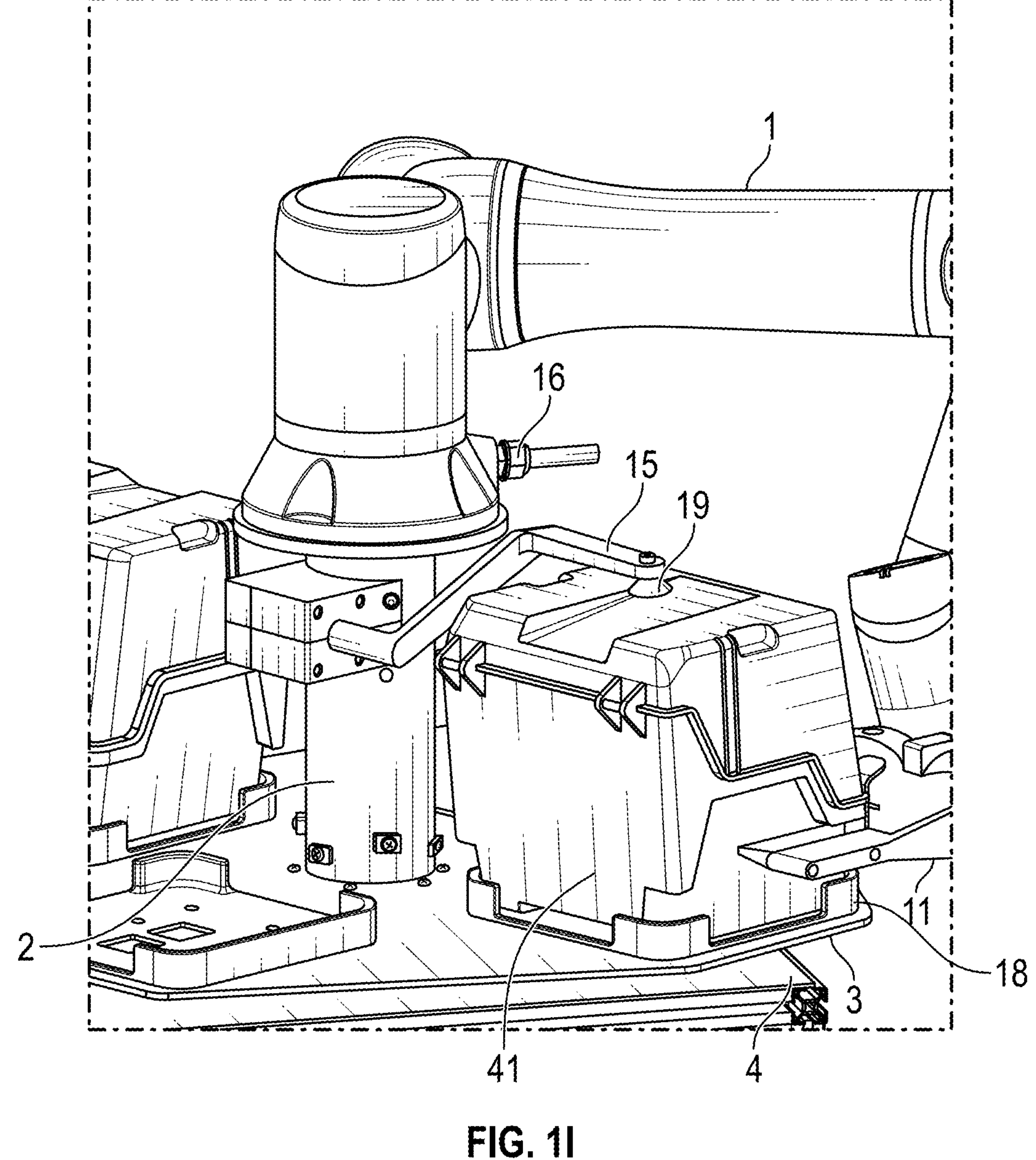
FIG. 1I is a side view of the robot of FIG. 1A focused on the box opener of the robot.
Figure 2B:
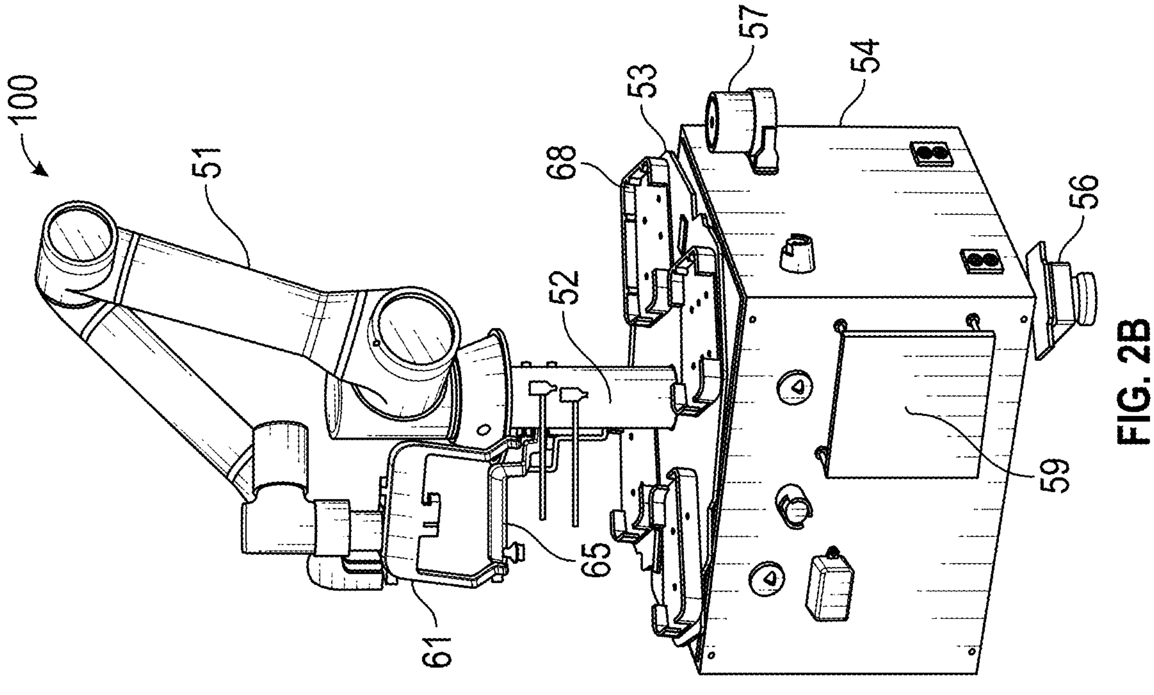
FIG. 2B is a perspective view of the robot of FIG. 2A.
Figure 2A:
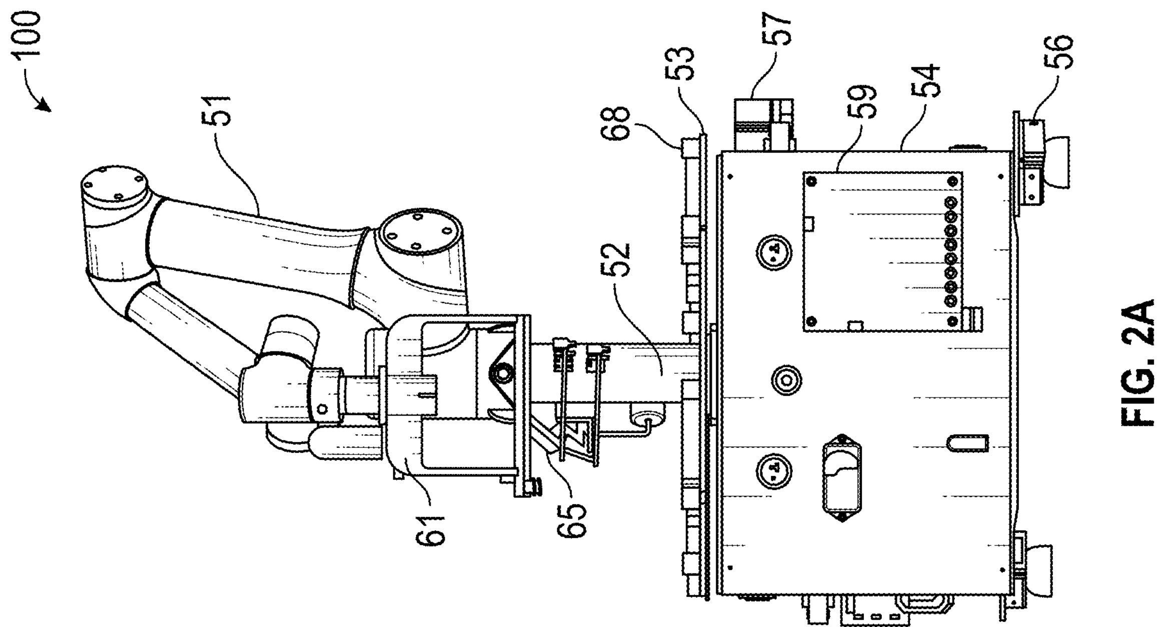
FIG. 2A is a side view of a robot detached from a base according to another embodiment.
Figure 2C:
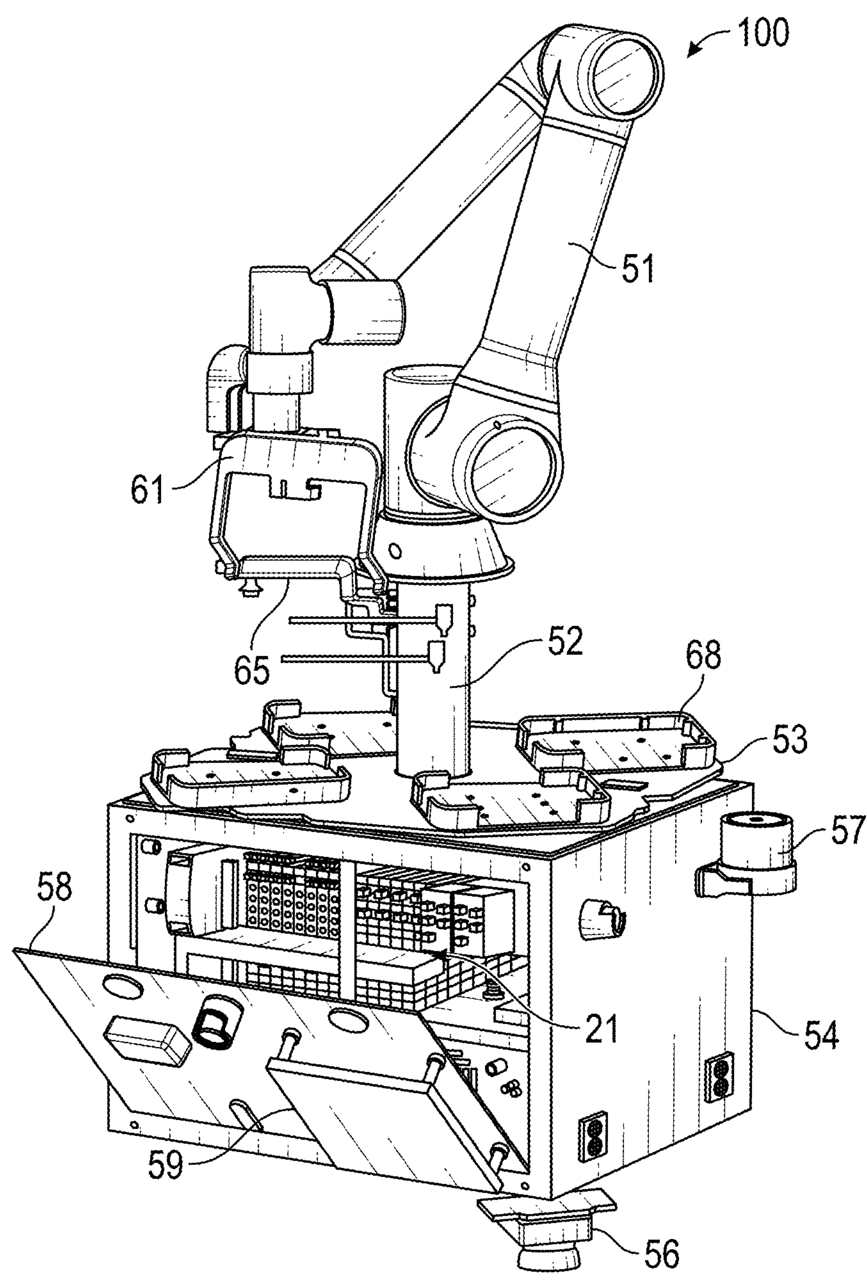
FIG. 2C is a perspective view of the robot of FIG. 2A with a housing cover opened.
Figure 2D:
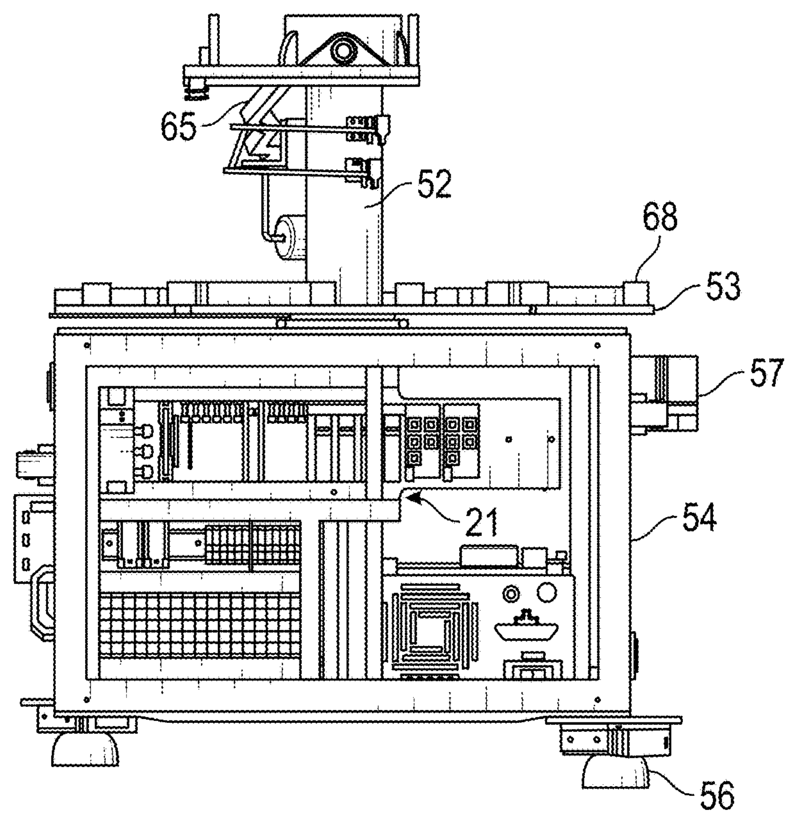
FIG. 2D is a side view of the robot of FIG. 2A with a housing cover removed.
Figure 2E:
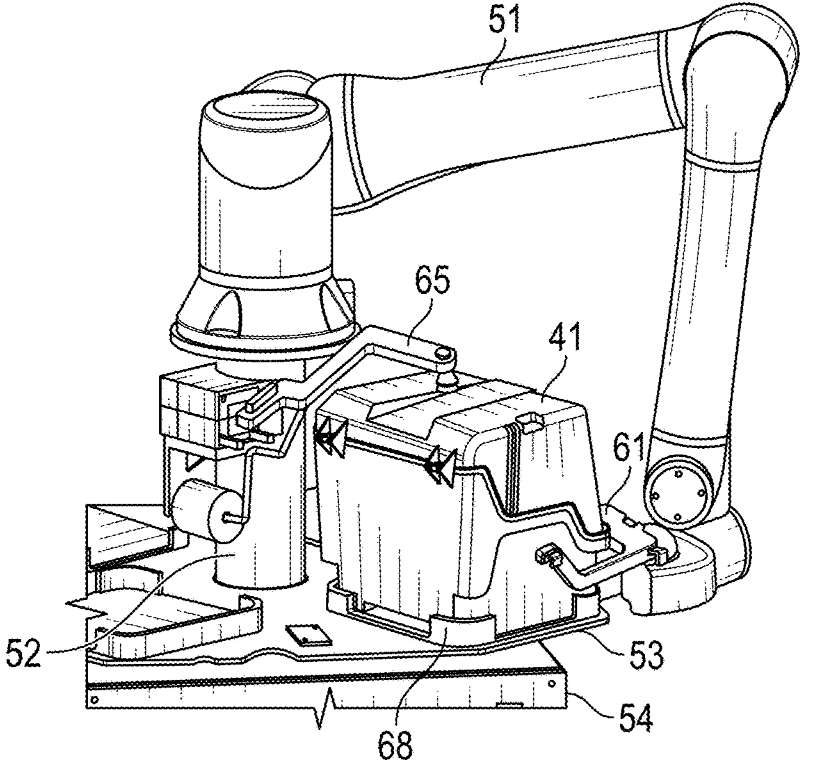
FIG. 2E is a perspective view of the robot of FIG. 2A focused on a closed lot box on a turntable of the robot.
Figure 2F:
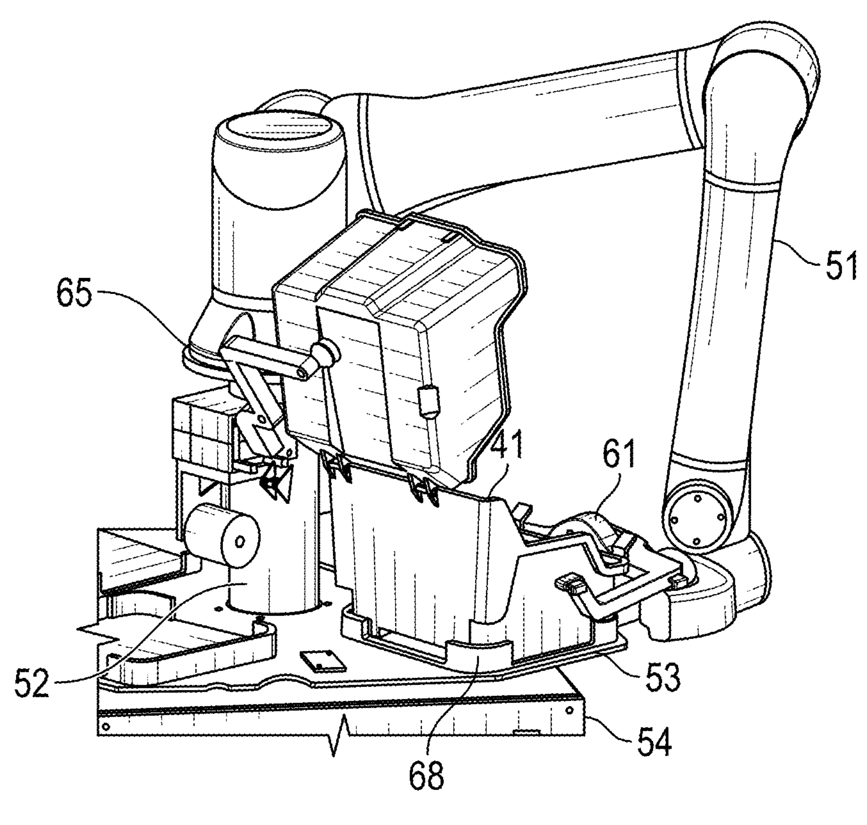
FIG. 2F is a perspective view of the robot of FIG. 2A focused on an opened lot box on the turntable of the robot.
Figure 2G:
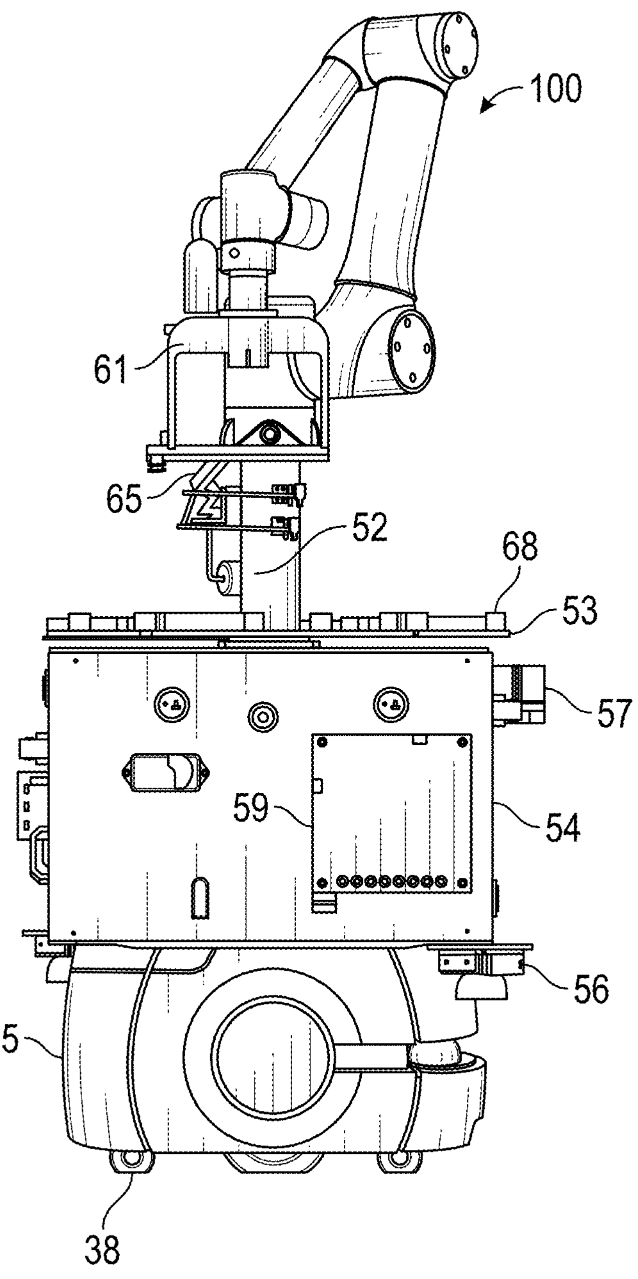
FIG. 2G is a side view of the robot of FIG. 2A attached to a mobile base.

For example, FIG. 1D depicts the lot box 41 after the turntable 3 radially aligns the box opening suction arm 15 to the lot box 41. In FIG. 1D, the end-effector 11 has been used to unlock the lot box 41, and the suction mechanism 19 has been engaged with the lot box's lid. Thereafter, as shown in FIG. 1E, the suction mechanism 19 can apply a suction force and the suction arm 15 actuates to open the lot box 41.

Once opened, the robotic arm 1 can be used to insert or remove a wafer cassette from the opened lot box, or to otherwise interact with the wafers stored in the lot box 41.

Accordingly, the robot 50 of FIGS. 1A-1I is suitable for navigating about a semiconductor fab to tend various process tools as desired. The robot 50 can be used to load wafer cassettes into or out of the process tools. Such wafer cassettes are stored in lot boxes 41 that can be inserted into or removed from corresponding holders 18 on the turntable 3 of the robot 50. Accordingly, the robot 50 can be used to fully automate the tending of process tools, thereby eliminating a need for legacy human driven processes and allowing removal of a person from the process tool tending flow.

The housing 4 is used to house various mechanical and electrical components 21 used to control the robot 50. Examples of the components 21 include motors, pumps, and/or gear boxes for controlling various components of the robot 4. For instance, the components 21 can be used to controllably rotate the turntable 3, selectively activate the suction mechanism 19, and/or to actuate the box opening suction arm 15 as desired. Examples of the components 21 further include power supplies, batteries/chargers, sensors, and/or circuit boards including electronic circuitry for processing data (for instance, sensor data) and controlling the robot 50.

Examples of sensors include vision/image sensors (for instance, a camera, a time-of-flight sensor, a scanning light-detection and ranging (LIDAR) sensor, and/or a scanning laser-detection and ranging (LADAR) sensor), inertial sensors (for instance, an inertial measurement unit or IMU), force sensors, and/or kinematic sensors. Such sensors can be integrated in the housing 4 or positioned as desired on the robot 50 and communicate with the electronic circuitry using wired, wireless, optical, and/or other communication links. In certain implementations, precision sensors are used to control rotation of the turntable 3 with a precise angular phase, velocity, and/or acceleration.

Furthermore, the mechanical and electrical components 21 can be implemented with a computing system for processing sensor data to control various operations of the robot 50. For example, the computing system can include memory hardware that operates in conjunction with data processing hardware to perform various functions, such as processing of sensor data, control of the robotic arm 1, rotation of the turntable 3, control of the mobile base 5 to navigate the robot 50 about a semiconductor fab, and/or to perform any other desired functions of the robot 50.

Such memory hardware stores instructions that when executed by the data causes the data processing hardware to perform various operations. These instructions (also known as computer programs, software, software applications or code) can be implemented in a high-level procedural and/or object-oriented programming language, and/or in assembly/machine language.

The data processing hardware can include one or more central processing units (CPUs), configurable compute units (for example, field programmable gate arrays or FPGAs), digital signal processors (DSPs), neural processing units (NPUs), application specific integrated circuits (ASICs), and/or any other hardware processing components. The memory hardware stores information non-transitorily within the computing system. The memory hardware can include a computer-readable medium, a volatile memory unit(s), and/or non-volatile memory unit(s). The memory hardware can include physical devices used to store programs (e.g., sequences of instructions) or data (e.g., program state information) on a temporary or permanent basis for use by the computing system. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random-access memory (DRAM), static random-access memory (SRAM), phase change memory (PCM) as well as disks or tapes.

FIGS. 2A to 2G depict various views of a robot 100 according to one embodiment. The robot 100 includes a robotic arm 51, a robotic arm pedestal 52, a turntable 53 (including lot box holders 58), a housing 54, and a mobile base 5. An end-effector 61 is attached an end of the robotic arm 51. Additionally, a box opening suction arm 15 is attached to the robotic arm pedestal 52.

The robot 100 of FIGS. 2A to 2G is similar to the robot 50 of FIGS. 1A to 1I, except that the robot 100 is implemented with variations of the components of the robot 50. The robots disclosed herein are highly modular and/or configurable, and thus can be implemented with different application layers, bases, and/or housings as desired. The robot 100 of FIGS. 2A to 2G also includes additional sensors and components relative to the robot 50 of FIGS. 1A to 1I.

For example, the robot 100 include a wireless charger 59 attached to a cover 58 of the housing 54. Additionally, a three-dimensional (3D) time-of-flight sensor 57 is included for advanced obstacle avoidance. Furthermore, one or more LIDAR safety scanners 56 are included to aid in inadvertent collisions of the robot 100 with other objects or people.

The robot 100 also includes the end-effector 61, which will now be discussed in detail with reference to FIGS. 3A to 3D.

Figures 3A, 3B:
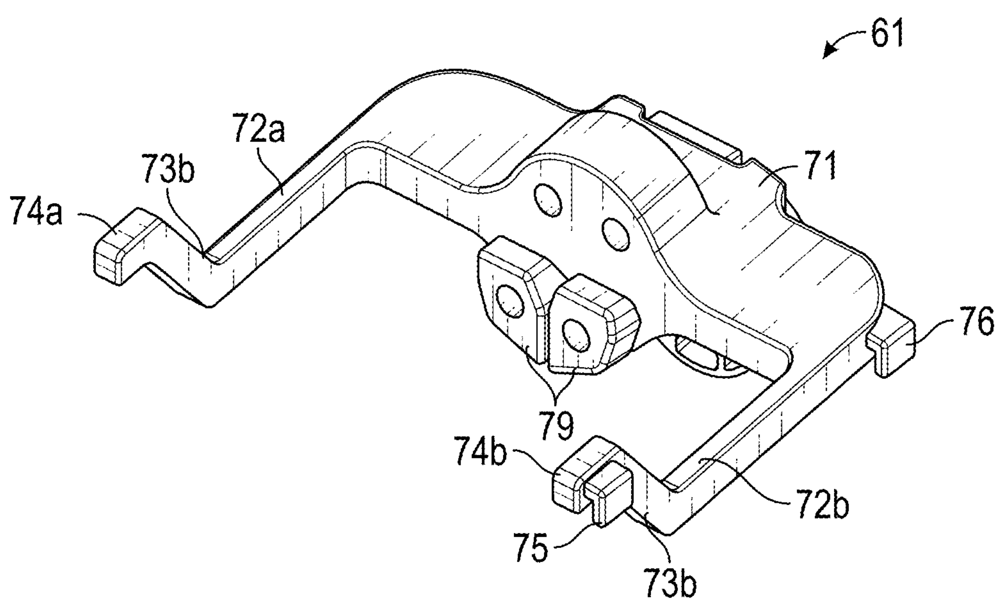
FIG. 3A is a front perspective view of an end-effector according to one embodiment.
FIG. 3B is a rear perspective view of the end-effector of FIG. 3A.
Figure 3C:
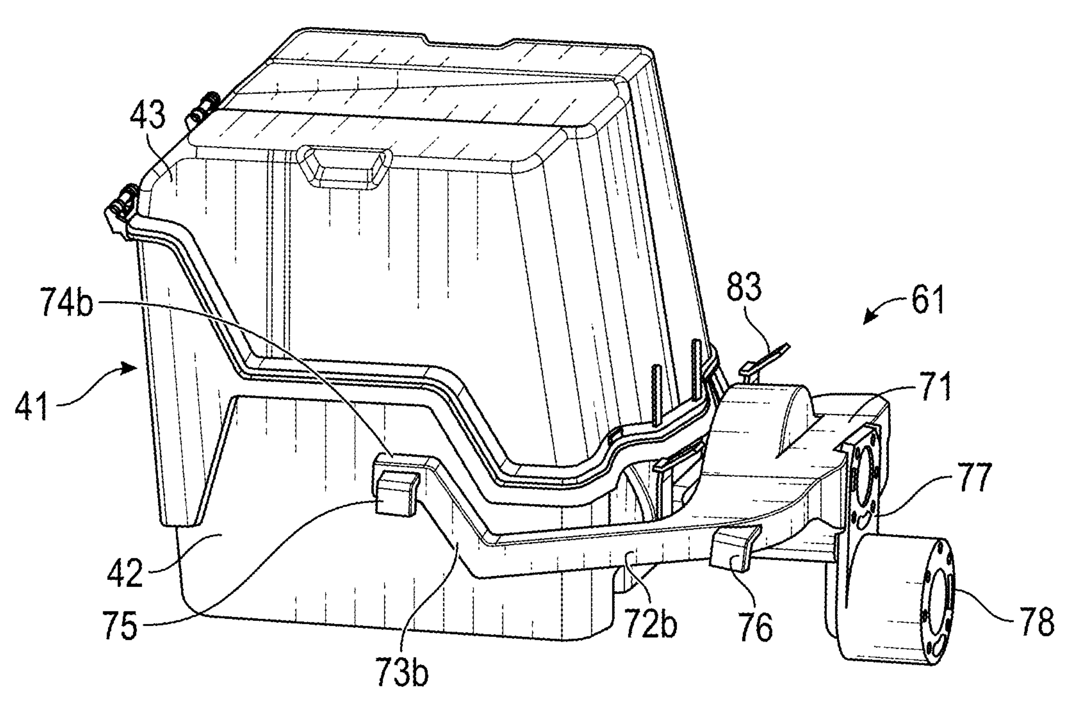
FIG. 3C is a side view of the end-effector of FIG. 3A interfacing with a closed lot box.
Figure 3D:
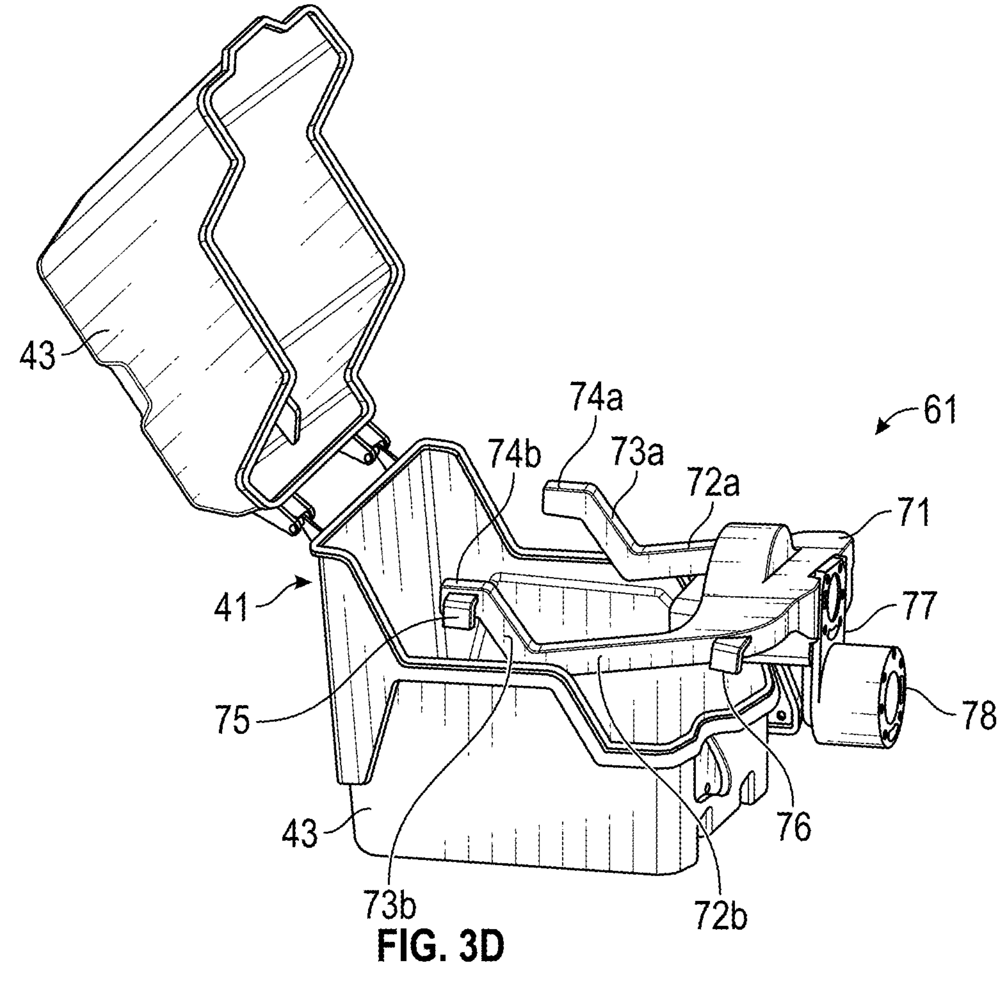
FIG. 3D is a side view of the end-effector of FIG. 3A and an open lot box.

FIG. 3A is a front perspective view of the end-effector 61. FIG. 3B is a rear perspective view of the end-effector 61 of FIG. 3A. FIG. 3C is a side view of the end-effector 61 of FIG. 3A interfacing with a closed lot box. FIG. 3D is a side view of the end-effector 61 of FIG. 3A and an opened lot box.

With reference to FIGS. 3A to 3D, the end-effector 61 includes a base 71, an offset linkage 77, a connector 78, a first arm 72*a*/73*a*/74*a*, a second arm 72*b*/73*b*/74*b*, cassette knuckles 79, an upper unlatching finger 75, and a lower unlatching finger 76.

In the illustrated embodiment, the connector 78 serves to a connect to an end of a robotic arm, such as to a tool flange of a 6-axis articulated robotic arm. The connector 78 is offset from the base 71 of the end-effector 61 by the offset linkage 77. Including the offset linkage 77 aids in providing additional clearance and maneuverability to ease the interaction of the end-effector 61 with the lot box 41. For example, the offset linkage 77 provides sufficient access for operating in tight work envelopes.

Figure 3E:
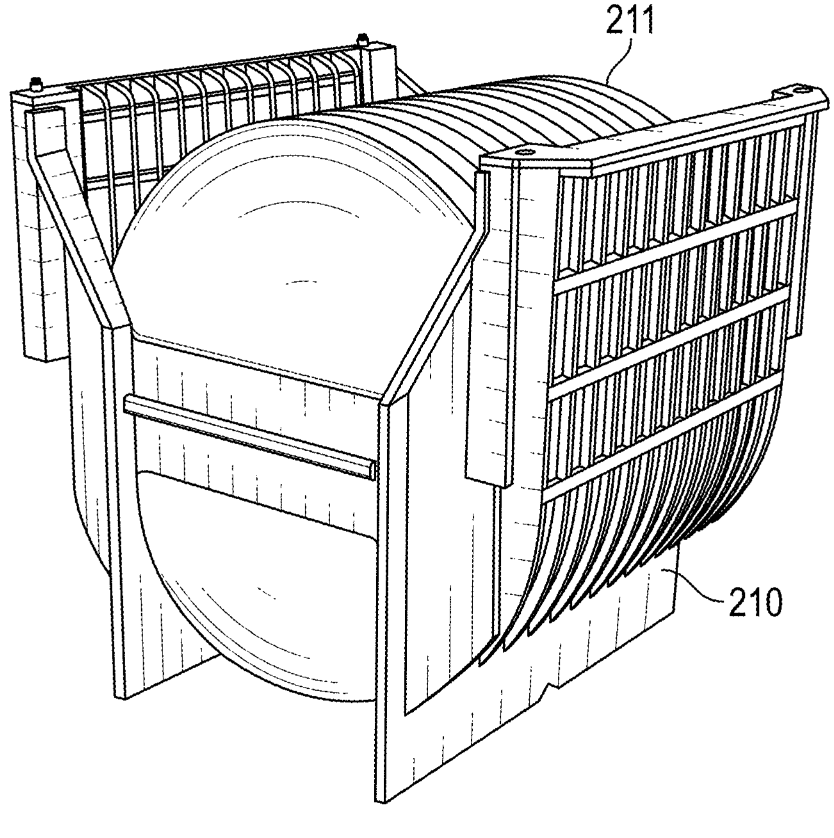
FIG. 3E is a perspective view of one example of a wafer cassette for the lot box.

As shown in FIGS. 3A to 3D, the end-effector 61 includes two arms that serve to provide a secure lot box hold and/or as a cassette interface for interfacing with a wafer cassette (for example, the wafer cassette 210 of FIG. 3E). Each arm includes a first extension portion 72*a*/72*b* extending away from the base 71, and an angled portion 73*a*/73*b* for elevating the arm relative to the base 71, and a second extension portion 74*a*/74*b* extending away from the angled portion. Such an arm configuration aids in manipulating lot boxes and/or wafer cassettes.

In the illustrated embodiment, the unlatching fingers 75/76 are included for unlatching lot boxes (for instance, to release one or more lot box latches).

In FIGS. 3C and 3D, the end-effector 61 is depicted as manipulating the lot box 41, which includes a base 42, a lid 43, and one or more lot box latches 83. The lot box 41 can be unlocked or picked by the end-effector 61. The lot box 41 can thereafter be opened (for instance, by a box opener of the robot), and thereafter the end-effector 61 can interact with a wafer cassette stored inside. The wafer cassette is not shown in FIGS. 3A to 3D for clarity of the figures. The end-effector 61 can also be used to load the wafer cassette back inside the lot box 41, which can thereafter be closed (and in certain implementations, locked) for transport.

FIG. 3E is a perspective view of one example of a wafer cassette 210 for the lot box 41. As shown in FIG. 3E, the wafer cassette 210 holds semiconductor wafers 211, such as 6-inch or 8-inch wafers. A cassette of wafers is also referred to herein as a work-in-process (WIP). Although one example of a wafer cassette is shown, the lot boxes herein can store a variety of types of wafer cassettes.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A robot for process tool tending in a semiconductor fab, the robot comprising:

a pedestal;

a robotic arm attached to the pedestal; and a turntable configured to rotate relative to the robotic arm and around the pedestal, wherein the turntable is configured to hold at least one lot box storing a wafer cassette of semiconductor wafers, wherein the robotic arm includes an end-effector configured to manipulate the at least one lot box, wherein the pedestal elevates the robotic arm over the turntable, and the pedestal passes through a center of the turntable such that the robotic arm is centered about the turntable.

2. The robot of claim 1, wherein the robotic arm is a 6-axis articulated robotic arm with 6 axes of freedom, and the turntable is operable to rotate to provide a 7th axis of freedom.

3. The robot of claim 1, wherein the end-effector is fully passive, the robotic arm and the end-effector operable to move the at least one lot box and insert or remove the wafter cassette from the at least one lot box.

4. The robot of claim 3, wherein the end-effector includes a pair of arms configured to interface with the at least one lot box.

5. The robot of claim 4, wherein the pair of arms includes one or more unlatching fingers configured to unlock the at least one lot box.

6. The robot of claim 4, wherein the pair of arms are connected by a base, wherein the end-effector further includes one or more knuckles attached to the base and operable to interface with the wafer cassette.

7. The robot of claim 4, wherein the pair of arms are connected by a base, wherein the end-effector further includes an offset linkage connecting the base to an end of the robotic arm.

8. The robot of claim 1, further comprising a box opener configured to open a lid of the at least one lot box.

9. The robot of claim 8, wherein the box opener includes a suction mechanism configured to apply a suction force to the lid and a box opener arm configured to actuate to open the lid.

10. The robot of claim 1, further comprising a housing supporting the turntable and including one or more components configured to control a rotation of the turntable and a plurality of movements of the robotic arm.

11. The robot of claim 10, further comprising a mobile base supporting the housing.

12. The robot of claim 1, further comprising at least one of a time-of-flight sensor or a LIDAR sensor configured to detect one or more obstacles in an environment of the robot.

13. The robot of claim 1, further comprising the at least one lot box storing the wafer cassette of semiconductor wafers and a plurality of lot box holders arranged on the turntable and holding the at least one lot box.

14. A method of robotic process tool tending in a semiconductor fab, the method comprising:

controlling a rotation of a turntable of a robot relative to a robotic arm of the robot, the robotic arm attached to a pedestal of the robot, the turntable rotating relative to the robotic arm and around the pedestal and holding at least one lot box storing a wafer cassette of semiconductor wafers, the robotic arm including an end-effector that manipulates the at least one lot box, wherein the pedestal elevates the robotic arm over the turntable and passes through a center of the turntable such that the robotic arm is centered about the turntable;

controlling a position of the robotic arm relative to the at least one lot box; and manipulating the at least one lot box using the end-effector of the robot.

15. The method of claim 14, wherein the end-effector is fully passive, the method further comprising interfacing the end-effector with the at least one lot box using a pair of arms of the end-effector.

16. The method of claim 15, further comprising unlocking the at least one lot box using one or more latching fingers of the pair of arms.

17. The method of claim 15, further comprising manipulating the wafer cassette using the end-effector.

18. The method of claim 14, further comprising opening a lid of the at least one lot box using a box opener of the robot.

* * * * *